United States Patent
Berke et al.

(10) Patent No.: US 9,819,824 B2
(45) Date of Patent: Nov. 14, 2017

(54) CUSTOM SCAN AREAS HISTORY AND CUSTOMIZATION

(71) Applicant: Xerox Corporation, Norwalk, CT (US)

(72) Inventors: David Berke, London (GB); Lakshmi Sujatha Yaramsetti, Hertfordshire (GB); Timothy David Jonathan Spink, Hertfordshire (GB); Veena Kumari Saluja, Hertfordshire (GB); Colin Hewitt, Hertfordshire (GB); Philip James Hambridge, Hertfordshire (GB)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/823,077

(22) Filed: Aug. 11, 2015

(65) Prior Publication Data

US 2017/0048401 A1    Feb. 16, 2017

(51) Int. Cl.
*H04N 1/00* (2006.01)
*H04N 1/32* (2006.01)
*H04N 1/387* (2006.01)
*H04N 1/04* (2006.01)

(52) U.S. Cl.
CPC ....... *H04N 1/0097* (2013.01); *H04N 1/00384* (2013.01); *H04N 1/00482* (2013.01); *H04N 1/0402* (2013.01); *H04N 1/32101* (2013.01); *H04N 1/3871* (2013.01)

(58) Field of Classification Search
None
See application file for complete search history.

(56) References Cited

U.S. PATENT DOCUMENTS

| | | | |
|---|---|---|---|
| 7,466,432 B2 | 12/2008 | Mitani | |
| 2005/0179914 A1* | 8/2005 | Fuse | H04N 1/393 358/1.2 |
| 2007/0092282 A1 | 4/2007 | Takenoshita | |
| 2008/0037059 A1* | 2/2008 | Inoue | G06F 3/1208 358/1.15 |
| 2009/0217193 A1* | 8/2009 | Tanaka | H04N 1/00411 715/781 |
| 2011/0135322 A1* | 6/2011 | Masuyama | B41J 11/485 399/16 |

* cited by examiner

*Primary Examiner* — Thomas D Lee
(74) *Attorney, Agent, or Firm* — Fay Sharpe LLP

(57) ABSTRACT

Devices and methods are described that facilitate the creation of a digital image of an object using a custom scan area size. Custom scan area sizes are stored and displayed so as to eliminate cumbersome steps such as measuring irregularly-sized objects more than once or processing the digital image after scanning the object to remove undesirable "white space."

19 Claims, 4 Drawing Sheets

CUSTOM SCAN AREAS HISTORY AND CUSTOMIZATION

BACKGROUND

The present disclosure relates to a device and method for scanning documents of customized sizes. While the devices and methods described herein relate to controlling the scanning area, it will be appreciated that the disclosed techniques may find application in other devices and methods. The disclosure can find application in, for example, a printing and copying center; however, the teachings made herein are amenable to other similar applications.

Commercial and home-use image scanners are devices that optically scan images, documents, or other objects of varying shapes and sizes, and convert it into a digital image. When scanning an object, users can make several imaging and quality selections in order to achieve the digital image in the desired size form, orientation, resolution, format, and color (also known as "settings"). The document size is a critical factor for some users in obtaining the optimal digital image. Today, if a user attempts to scan an object that is smaller than the platen glass surface of the scanner, the resulting digital image may contain significant amounts of undesirable blank or "white" space, which may be visually undesirable to a user.

While some current scanners have functionality that allows them to receive custom size selections, the process for scanning such documents can be repetitive and redundant for users that enter the size selections each time they go to the scanner. Certain business operations require a user to routinely scan different size objects. For example, many rental car companies require a person to provide identification when picking up the car. These identifications can take many forms—such as, license and passport, etc.—of varying sizes. The practice of back-to-back scanning different sized identifications can slow down business operations and/or lead to inefficiencies. Further, the practice of repeatedly customizing the size selection for the identification, should the same object be scanned again within a few transactions, can also lead to inefficiencies. Of course, a car rental business operation is but one contemplated scenario where such needs are not met. There are certainly a number of other business operations which lend themselves well to the same needs.

Thus, ensuring the accurate determination of precise scan area size in order to achieve the desired digital image can be difficult and time-consuming. Accordingly, there is an unmet need for devices and/or methods that facilitate the selection of accurate custom scan area sizes while overcoming the aforementioned drawbacks.

What is needed is a functionality that allows users to recall recent customized selections such that the custom size settings are not required for reentry into the graphic user interface. What is further needed is a functionality that allows for such customized size settings to be easily recognized while being recalled.

BRIEF DESCRIPTION

One embodiment of the disclosure includes an image forming device including a scanner for generating a scan image of a object. The scanner includes a control panel configured to interface with a user. The control panel includes a custom size setting option displayed on the control panel for receiving custom size values of a current document. The control panel further includes a recall list of previous custom size values associated with previously scanned objects. The image forming device also includes a processor in communication with the control panel and configured to control the scanner. The processor is programmed to set the custom size values to the scanner for generating the scan image of the current object, in response to receiving custom size values as input via the control panel. In response to receiving a selection for a previous custom size values associated with a previously scanned object, the processor is further configured to set the previous custom size values to the scanner for generating the scan image of the current object.

Another embodiment of the disclosure is directed to a method of generating scanned images. The method includes providing a control panel configured to interface with a user. The method includes providing a custom size setting option displayed on the control panel for receiving custom size values of a current object. The method includes providing a recall list of previous custom size values associated with previously scanned objects. In response to receiving custom size values as input via the control panel, the method includes setting the custom size values to a scanner for generating the scan image of the current object. In response to receiving a selection for a previous custom size values associated with a previously scanned object, the method includes setting the previous custom size values to the scanner for generating the scan image of the current object. The method also includes generating a scan image of the current object using a scanner.

DETAILED DESCRIPTION

In accordance with various features described herein, devices and methods are described that facilitate the generation of a scanned or digital image of an object without significant "white" space surrounding the document based on a custom scan area size. The embodiments described herein facilitate the detection, selection, customization, storage, and retrieval of a plurality of custom scan size areas, and eliminates the need for manual operations required for processing the settings associated with a digital image before the object is scanned.

As used herein, the terms "digital image" and "scanned image" mean the electronic representation of the object formed as the result of the object being scanned.

As used herein, the term "object" refers to any item to be scanned using the described devices and methods. A non-limiting list of objects may include images, pictures, documents, papers, books, fingerprints, business cards, and forms of identification.

As used herein, the term "white space" refers to the blank space surrounding the digital image of an object that has been scanned. In other words, a digital image of an object that has been scanned with a scan area size larger than the size of the object will contain "white space."

Figure 1:
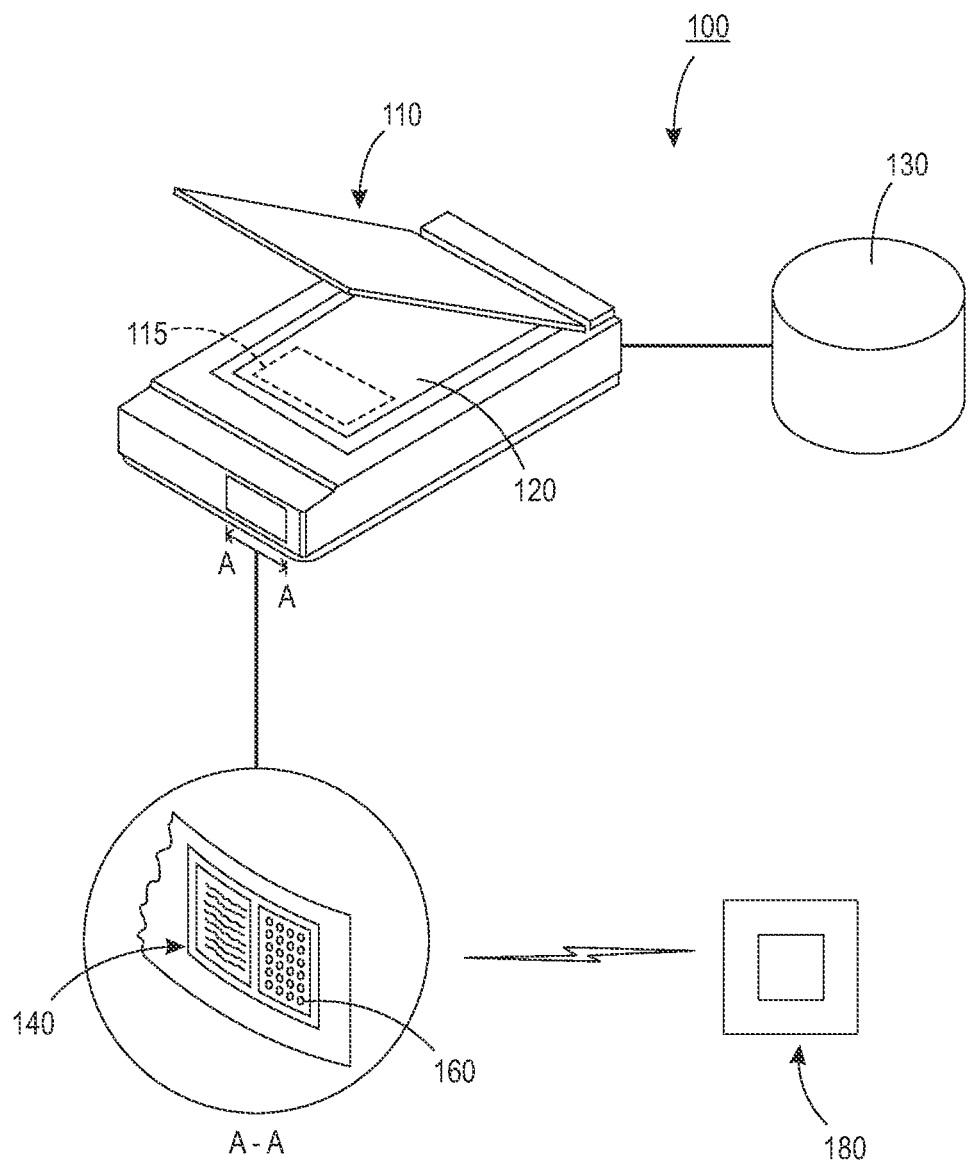
FIG. 1 is a graphical illustration of an image forming device according to one embodiment of the present disclosure.

With reference to FIG. 1, an image forming device 100 comprises a scanner 110 that scans one or more objects and can store the settings associated with each object in storage 130, which can include a database or memory. The scanner includes a platen or object bed 120, where an object is placed to be scanned.

In one embodiment, the device 100 comprises a control panel 140 configured to interface with a user. In FIG. 1, this control panel is shown in exploded view A-A. In particular embodiments the control panel 140 includes, inter alia, a custom scan size selection display 150 that receives the custom scan size values of a current document. In some embodiments, the control panel 140 may include a user input device 160, such as a keyboard, or the input device 160 may be the control panel 140 itself, such as a touchscreen monitor, which may receive the custom size value of the current document as manual input data provided from a user.

In particular embodiments, the control panel 140 further displays a navigable recall list 165 of custom scan area sizes. In other words, the control panel 140 can include a list of a plurality of previous custom scan area size values associated with previously scanned objects. In particular embodiments, the previous custom scan area size values are stored in the memory 130 of the device 100.

According to some embodiments, the device 100 further includes a processor 170 in communication with the control panel 140. In particular embodiments, the processor 170 is configured to control the scanner 110, and is programmed to set the custom scan area size 115 of the scanner 110 in response to receiving the user input. In other words, the processor 170 is configured to execute computer-readable instructions stored in the memory 130 for controlling the area 115 of the platen 120 to be scanned, and to generate a digital image of an object within such an area 115 based upon some user input received at the control panel 140.

In some embodiments, the user input is the custom size values received as input via the control panel 140. In other embodiments, the user input is a selection from a set of previous custom scan area size values associated with previously scanned objects received as input via the control panel 140.

In particular embodiments, the device 100 further comprises a database, and the processor is configured to store the custom size values of the current object in response to receiving the custom scan area size values as the input via the control panel 140. In some embodiments, the database may be the memory 130, or may be an additional storage medium.

According to some embodiments, the control panel 140 further display a custom label setting. In other words, the processor 170 may be configured to receive user input wherein the input is a user-defined custom label associated with the custom scan area size values of the current object. In particular embodiments, the control panel 140 may display a keyboard in response to the custom label setting being selected and in order to receive such user input when, for example, the control panel 140 is a touchscreen control panel 140. In other embodiments, the control panel 140 may receive such user input at an input device 160, for example, at a keyboard, when the control panel 140 is not a touchscreen control panel 140.

In some embodiments, the processor 170 may associate a custom label provided as input via the control panel 140 with the custom scan area size values of the current object.

In other embodiments, the custom label may correspond with a particular type or classification of the current document. For example, if the current object to be scanned is a passport, the custom label may correspond with the custom scan area size values for passports.

According to various aspects of the present invention, the type of object to be scanned may be an identification form where business operations require scanning of such object. The identification form can be selected from a group comprising a driver's license; a passport; a passport card; a birth certificate; a certificate of citizenship; and a certificate of naturalization, and a combination of the above. However, there is no limit made herein to the type of object being scanned or the business operation using such scanned objects.

According to some embodiments, the recall list of the control panel 140 displays a plurality of previous custom scan area size values associated with previously scanned objects. In particular embodiments, the recall list of the control panel 140 may display a predetermined number ("n") of previous custom scan area size values associated with previously scanned objects or stored custom size values. In particular embodiments, the number n of previous custom size values displayed on the recall list is determined by the size of the control panel 140, or by the amount of memory 130 available, or by the amount of space available on an alternate database, or is a predetermined number associated with the device or provided by a user of the device 100. For example, in particular embodiments, the predetermined number may be between 0 and 100, or for smaller displays, the predetermined range can be scaled to between 0 and 15. Of course, for business practices which the user moves between a small number n of objects, the recall list can be relatively short.

Similarly, according to various aspects of the present invention, the recall list may display a predetermined number of custom labels each associated with the previous custom size values of a previously scanned object.

Figure 2:
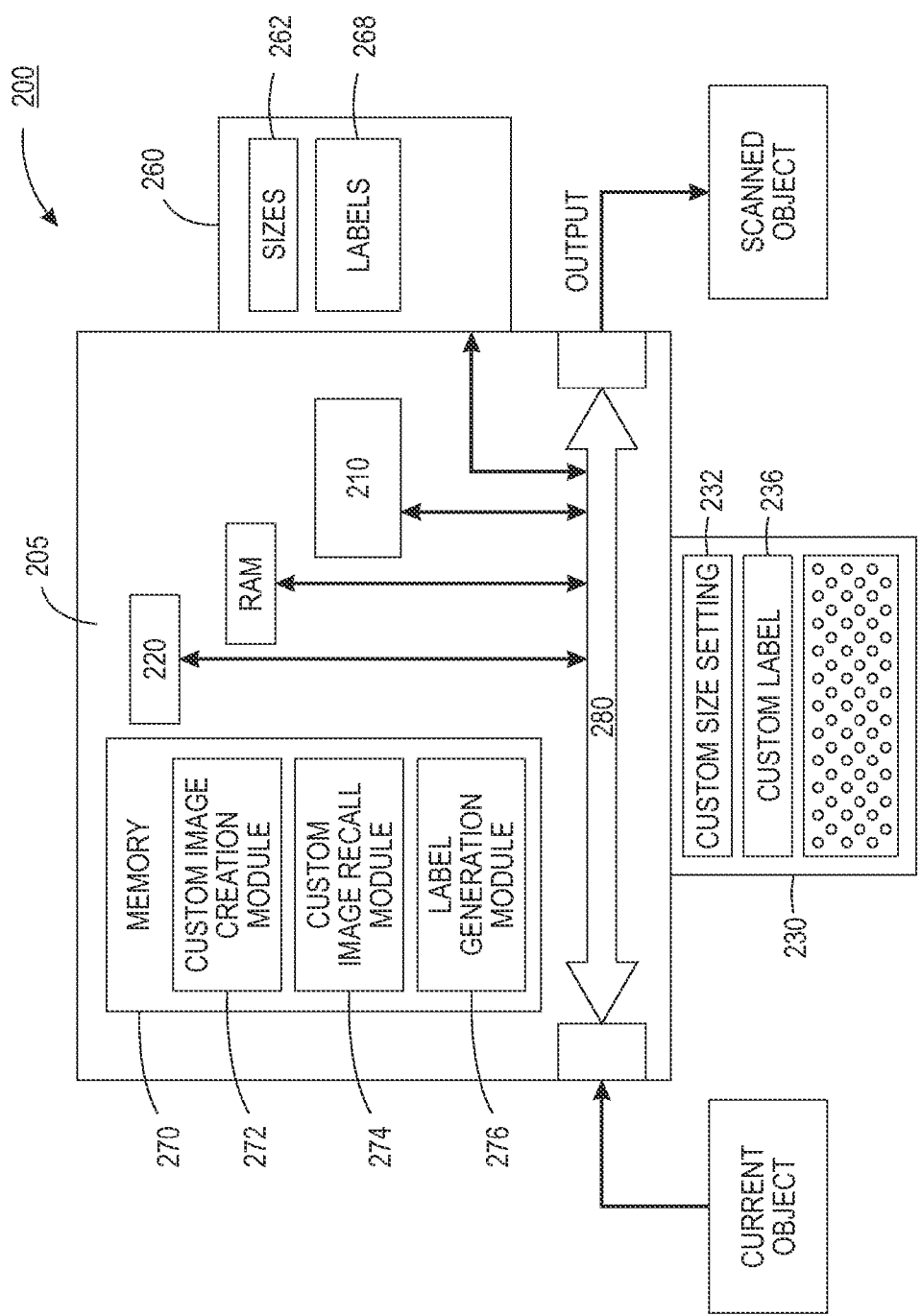
FIG. 2 is schematic diagrammatic illustration of an image forming device according to another embodiment of the present disclosure.

FIG. 2 is a schematic illustration of a scan system in one exemplary embodiment. The system 200 includes an image forming device 205—illustrated as a scanner 210, but which can take the form of a multifunction device including scan capability among other capabilities. The system 200 also includes a storage device 260, which may be linked together with the scanner 210 by communication links, referred to herein as a network. In one embodiment, the system 200 may be in further communication with a remote or local user device (not shown) and can receive the custom size settings from a user at the user device. As mentioned, supra, the scanner 210 also includes a platen glass bed 120 (FIG. 1) for receiving a document to be scanned. These components are described in greater detail below.

The system 200 illustrated in FIG. 2 includes a controller or processor 220 that is part of or associated with the image forming device 205. The exemplary processor 220 is adapted for setting custom size values to the scanner 210 for generating the scan image of a current object and/or setting previous custom size values to the scanner for generating the scan image of the current object. The processor 220 can control the overall operation of the image forming device 205 by execution of processing instructions that are stored in memory 270 connected to the processor 220.

The memory 270 may represent any type of tangible computer readable medium such as random access memory (RAM), read only memory (ROM), magnetic disk or tape, optical disk, flash memory, or holographic memory. In one embodiment, the memory 270 comprises a combination of random access memory and read only memory. The digital processor 220 can be variously embodied, such as by a single-core processor, a dual-core processor (or more generally by a multiple-core processor), a digital processor and cooperating math coprocessor, a digital controller, or the like. The digital processor, in addition to controlling the operation of the image forming device 205, executes instructions stored in memory 270 for performing the parts of the method outlined in FIG. 3. In some embodiments, the processor 220 and memory 270 may be combined in a single chip.

The scanner 210 may be embodied in a networked device, such as the image forming device 205, although it is also contemplated that the scanner 210 or the GUI 230 may be located elsewhere on a network to which the system 200 is connected, a networked computer, or the like, or distributed throughout the network or otherwise accessible thereto. The scan and recall phases disclosed herein are performed by the processor 220 according to the instructions contained in the memory 270. In particular, the memory 270 stores a custom image creation module 272, which sets custom size values to the scanner for generating a scan image of a document using the custom settings for the first time; a custom image recall module 274, which sets previous custom size values to the scanner for generating a scan image of a document using custom settings previously provided for a different job; and a label generation module 276, which associates a label with the custom size setting for easy identification on the control panel display. Embodiments are contemplated wherein these instructions can be stored in a single module or as multiple modules embodied in the different devices. The modules 272-276 will be later described with reference to the exemplary method.

The software modules as used herein, are intended to encompass any collection or set of instructions executable by the image forming device 205 or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server (not shown) or other location to perform certain functions. The various components of the image forming device 205 may be all connected by a bus 280.

The system 200 may include one or more special purpose or general purpose computing devices, such as a server computer or digital front end (DFE), or any other computing device capable of executing instructions for performing the exemplary method.

With continued reference to FIG. 2, the system 200 includes a storage device 260 that is part of or in communication with the image forming device 210. In a contemplated embodiment, the image forming device 210 can be in communication with a server (not shown) that includes a processing device and memory, such as storage device 260, or has access to a storage device 260, for storing custom size values 262 previously provided as a settings selection associated with previously scanned objects and custom labels associated with the custom size settings of previously scanned objects 268.

With continued reference to FIG. 2, the system further includes a graphic user interface (GUI) 230 or "control panel" in communication with the processor 220. The control panel 230 can include a display for displaying the information, to users, and a user input device, such as a keyboard or touch or writable screen, for receiving instructions as input for communicating user input information and command selections to the processor 220. The control panel 30 can further include a scroll device for moving up and down a recall list or, in contemplated embodiment, side-to-side for displaying additional settings information associated with an object on the list.

According to various aspects of the present disclosure, the control panel 230 is configured to interface with a user, and may include a custom size setting option 232 displayed on the control panel 230 for receiving the custom size values of a current object. The control panel 230 may also include a recall list 234 of previous custom size values associated with previously scanned objects.

According to some embodiments, the processor 220 is configured to control the scanner. In response to receiving custom size values as input via the control panel 230, the processor 220 may send the custom size values to the scanner 210 for generating the scan image of the current document. Alternatively, in response to receiving a selection for a previous set of custom size values associated with a previously scanned object, the processor 220 may send the previous custom size values to the scanner 210 for generating the scan image of the current object. In particular embodiments, the previous set of custom size values associated with a previously scanned document are displayed in the recall list 234 of the control panel 230.

In particular embodiments of the present disclosure, the storage 260 or database is programmed to store the custom size values of the current document in response to receiving the custom size values as the input via the control panel 230. In particular embodiments, the processor 220 may be programmed to store the custom size values 262 of the current document in response to receiving the custom size values as the input via the control panel 230.

In some embodiments, the control panel 230 further includes a custom label setting 236. The processor 220 can be configured to associate a custom label 268 provided as input via the control panel 230. In particular embodiments, the processor 220 can associate a custom label 268 provided as input via the control panel 230 with the custom size values of the current document. Additionally, the label generation module 276 may cause the control panel 230 to display a keyboard in response to the custom label setting 236 being selected.

In some embodiments, the custom label 268 may correspond with a type of the current document. For example, the type of documents may include an identification form selected from a group comprising: a driver's license; a passport; a passport card; a birth certificate; a certificate of citizenship; and a certificate of naturalization.

In some embodiments, the recall list 234 displays a predetermined number "n" of previous custom size values 262 of previously scanned documents. In particular embodiments, the previous custom size values 262 may be stored in the memory 260. In further embodiments, the recall list 234 displays a predetermined number of custom labels 268 associated with the previous custom size values 262 of previously scanned documents.

Figure 3:
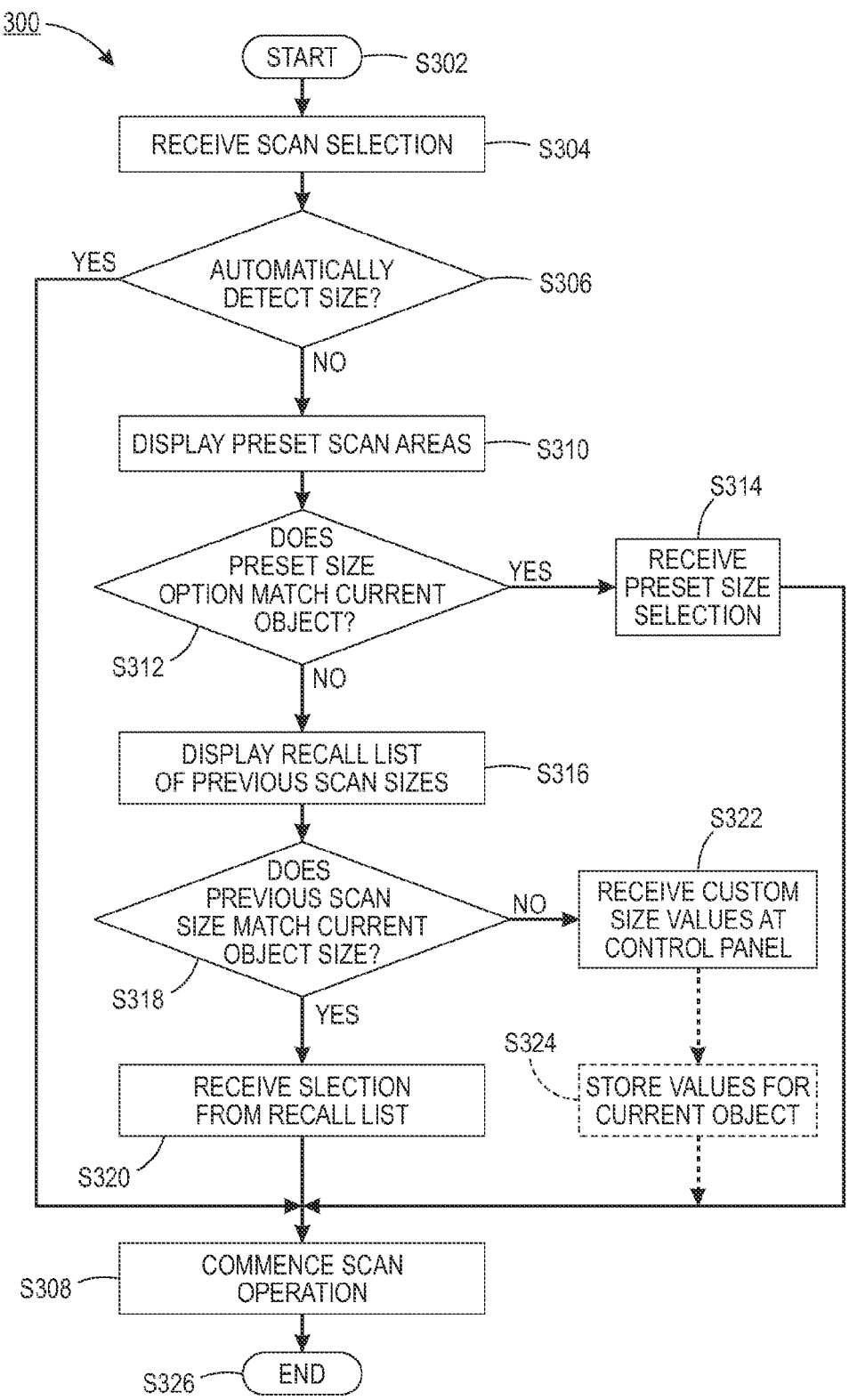
FIG. 3 is a flowchart illustrating a method of generating a scanned image according to another embodiment of the present disclosure.

With reference to FIG. 3, a method S300 of generating scanned images is provided according to one embodiment of the present disclosure. The method 300 starts a S302. On a multifunction device or image forming device, the control panel may include various settings for copying or scanning. In one embodiment, the image forming device can receive input indicating that a user has selected a scan operation at S304. In response to a notification of this selection being received at the processor, the processor can initiate an automatic detection process. If the image forming device has the functionality of automatically detecting the original size of the current object on the platen bed (YES at S306), the system can commence the copy job at S308. If the image forming device does not have the functionality of automatically detecting the object size (NO at S306), the processor causes the control panel to display an icon which allows the user to manually enter the desired custom size selections. As part of this functionality, the control panel displays a selection for preset scan areas at S310. In response to this selection being made by the user, the processor causes the control panel to display standard preset sizes, which can include sizes that are preprogrammed into the image forming device during, for example, calibration of the image forming device. In response to the current object meeting a preset size selection (YES at S312), the processor receives a user selection (at the control panel) for a preset size at S314. The processor commences the scan operation at S308 for generating a digital image using the preset size selection.

In response to the current object not meeting a preset size selection (NO at S312), the processor can display a recall list or history of previously scanned object sizes at S316. In one embodiment, the control panel can display this list in response to a user selection being made for the list. In another embodiment, the control panel can display this list in response to a user exiting, canceling, or rejecting the preset sizes.

More specifically, the recall list includes the custom size values previously input by users of the local image forming device or a different image forming device on the network.

In response to the current object being the same size as a previously scanned object—i.e., the dimensions/values of the current object being displayed on the recall list (YES at S318), the processor receives a user selection (at the control panel) for a previously stored values at S320. The processor commences the scan operation at S308 for generating a digital image using the previously stored values that were selected.

In response to the current object not meeting a previously stored value being displayed on the recall list (NO at S318), the processor can display a keyboard or input option which allows for custom size values to be manually entered into the image forming device. The processor receives the custom size values at S322.

The custom image creation module 272 can set the custom size values to the scanner for generating a scan image of a document using the custom settings for the first time. The processor commences the scan operation at S308 for generating a digital image using the custom size values manually entered for the current object. The module can also store the custom size values in the storage at S324. In one embodiment, storage of the custom size values can be made optional, should the user know in advance that there is no need to scan a similarly sized object in the future. The method ends at S326.

In one embodiment, the custom image recall module 274 can retrieve the custom size values of the current object from the storage and display these values on the recall list. The recall list can display the custom size values of a predetermined number n of previous scanned objects in sequence from most recent, thus the custom size values manually entered for the current object will appear first on the recall list in a subsequent scan operation. In another embodiment, the recall list can display the values based on user preferences, such as from largest scan area to smallest scan ear, or the reverse, etc. The method ends at S320. In another embodiment, the recall list can be ordered sequentially, displaying the most frequently selected custom scan sizes/labels at the top of the list.

Figure 4:
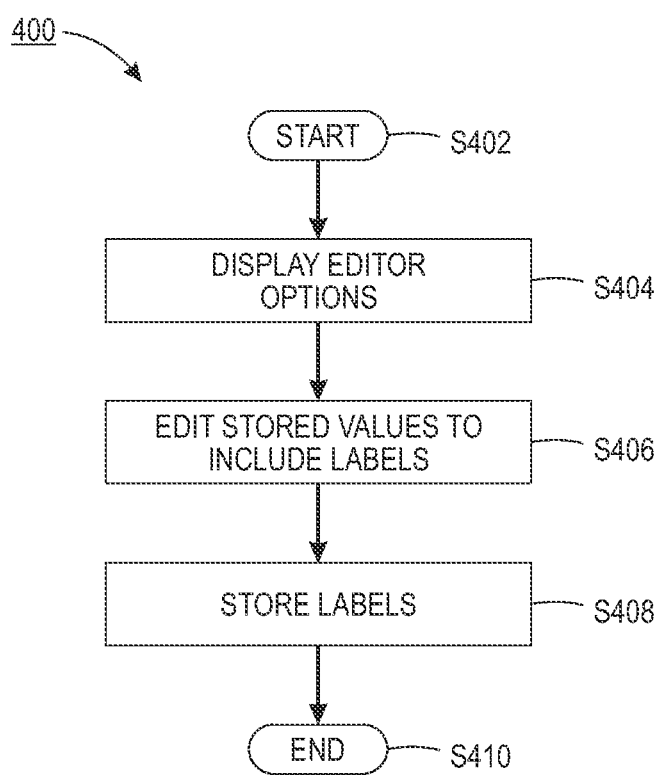
FIG. 4 is a flowchart illustrating a method for associating a label or tag with a currently scanned object.

In another embodiment, in addition to or as an alternative to the custom size values of previously scanned objects being displayed on the recall list, the control panel can display custom labels on the recall list. A method 400 for associating a custom label with a scanned document is illustrated in FIG. 4. The method starts at S402. In response to the custom size values being set to the scanner for the first time, the label generation module 276 enables a custom size history editor option to be displayed on the control panel.at S404. In one embodiment, this option corresponds to a custom label setting. In response to a user selecting the option as input via the control panel, the module displays a keyboard to allow a user to assign a label with the custom size setting of the current document. The label can be a type-written title of the object, such as the type of document, which the user associates with the custom values. For example, for the illustrative example of the document being an identification form, this label can be "passport" or "license" or, more specifically, "U.S. Passport" or "U.S. license". In the illustrative example where a car rental company scans the identification of its customers, many customers from different regions of the world can visit one car rental agency. Drivers licenses can be of varying sizes depending on the country of issue.

Once the user manually enters the label, the module can edit the custom values being stored in the system at S406. In one embodiment, the module can generate a tag for associating the values as corresponding with the custom value data. The module then stores the custom size labels in a history table at S408.

In certain embodiments, the recall list can display the labels in lieu of the values. In response to the user selecting an object from the list based on the label—for example, "U.S. License", the module can access a history table and determine the custom size values corresponding to that label. The processor can continue to commence the scanning operation using the retrieved values. The method ends at 410.

Embodiments are contemplated, as well, where a user can edit the stored data of a previously scanned object, not at the time the object is scanned and the values are being provided as input for the first time. Instead, the user or an administrator can select the history editor option on the control panel, which can prompt the recall list to be displayed thereon. The user can navigate or scroll down the list and select the custom size entry from the list. In response to the selection, the keyboard is displayed and the operation follows as described in the method 400 of FIG. 4. The user can be asked log-in to initiate the editing and log-out when the editing is complete.

Although the method is illustrated and described above in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system 200, wherein the disclosure is not limited to the specific applications and embodiments illustrated and described herein.

It will be appreciated that various of the above-disclosed and other features and functions, or alternatives thereof, may be desirably combined into other different systems or applications. Also that various presently unforeseen or unanticipated alternatives, modifications, variations, or improvements therein may be subsequently made by those skilled in the art that are also intended to be encompassed by the following claims.

What is claimed is:

1. An image forming device, comprising:
    a scanner for generating a scan image of a document;
    a control panel configured to interface with a user, the control panel including:
        a custom size setting option displayed on the control panel for receiving custom size values of a current document; and
        a recall list of previous custom size values of previously scanned documents associated with previously scanned objects; and
    a processor in communication with the control panel and configured to control the scanner, the processor being programmed to:
        in response to receiving custom size values as input via the control panel, set the custom size values to the scanner for generating the scan image of a current object, and
        in response to receiving a selection for a previous custom size values associated with a previously scanned object, set the previous custom size values to the scanner for generating the scan image of the current object to remove undesirable white space surrounding the current object.

2. The image forming device of claim 1 further comprising a database, wherein the processor is programmed to store the custom size values of the current object in response to receiving the custom size values as the input via the control panel.

3. The image forming device of claim 1, wherein the control panel further includes a custom label setting, the control panel displaying a keyboard in response to the custom label setting being selected.

4. The image forming device of claim 3, wherein the processor associates a custom label provided as input via the control panel with the custom size values of the current object.

5. The image forming device of claim 3, wherein the custom label corresponds with the current object.

6. The image forming device of claim 3, wherein the current object is an identification form.

7. The image forming device of claim 6, wherein the identification form is selected from a group consisting of:
    a driver's license;
    a passport;
    a passport card;
    a birth certificate;
    a citizenship of citizenship;
    a certificate of naturalization; and
    a combination of the above.

8. The image forming device of claim 1, wherein the recall list displays a predetermined number of the previous custom size values of previously scanned objects.

9. The image forming device of claim 1, wherein the recall list displays a predetermined number of custom labels corresponding with the previously scanned objects.

10. The image forming device of claim 1, wherein the recall list displays a predetermined number of custom labels each associated with the previous custom size values of a previously scanned object.

11. A method of generating scanned images, the method comprising:
    providing a control panel configured to interface with a user;
    providing a custom size setting option displayed on the control panel for receiving custom size values of a current object;
    providing a recall list of previous custom size values of previously scanned objects;
    in response to receiving custom size values as input via the control panel, setting the custom size values to a scanner for generating the scan image of the current object;
    in response to receiving a selection for a previous custom size values associated with a previously scanned object, setting the previous custom size values to the scanner for generating the scan image of the current object to remove undesirable white space surrounding the current object; and
    generating a scan image of the current object using a scanner.

12. The method of claim 11 further comprising storing the custom size values of the current object in response to receiving the custom size values as the input via the control panel.

13. The method of claim 11 further comprising:
    providing a custom label setting on the control panel; and
    displaying a keyboard in response to the custom label setting being selected.

14. The method of claim 11 further comprising associating a custom label provided as input via the control panel with the custom size values of the current object.

15. The method of claim 11, wherein the custom label corresponds with the current object.

16. The method of claim 11, wherein the current object is an identification form.

17. The method of claim 16, wherein the identification form selected from a group consisting of:
    a driver's license;
    a passport;
    a passport card;
    a birth certificate;
    a citizenship of citizenship;
    a certificate of naturalization; and, a combination of the above.

18. The method of claim 11 further comprising displaying on the recall list a predetermined number of the previous custom size values of previously scanned objects.

19. The method of claim 11 further comprising displaying on the recall list a predetermined number of custom labels each associated with the previous custom size values of a previously scanned object.

* * * * *